US 6,560,074 B2

(12) United States Patent
Gillis et al.

(10) Patent No.: US 6,560,074 B2
(45) Date of Patent: May 6, 2003

(54) OFFSET LIMITER FOR REDUCING POTENTIAL OF DISK DAMAGE DURING UNLOAD SEQUENCE IN LOAD/UNLOAD DISK DRIVE

(75) Inventors: Donald Ray Gillis, San Jose, CA (US); Mike Suk, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 09/972,043

(22) Filed: Jan. 16, 2001

(65) Prior Publication Data
US 2002/0093767 A1 Jul. 18, 2002

(51) Int. Cl.[7] .................................................. G11B 5/48
(52) U.S. Cl. .................................................... 360/245.7
(58) Field of Search ........................... 360/245.1–245.8

(56) References Cited

U.S. PATENT DOCUMENTS

| | | |
|---|---|---|
| 4,939,611 A | 7/1990 | Connolly |
| 5,237,472 A | 8/1993 | Morehouse et al. |
| 5,239,431 A | 8/1993 | Day et al. |
| 5,331,489 A * | 7/1994 | Johnson et al. ............ 360/245.5 |
| 5,486,964 A | 1/1996 | Morehouse et al. |
| 5,757,587 A | 5/1998 | Berg et al. |
| 5,930,079 A | 7/1999 | Vera et al. |
| 5,956,209 A * | 9/1999 | Shum ....................... 360/245.5 |
| 5,995,330 A | 11/1999 | Furay et al. |
| 6,032,352 A | 3/2000 | Furay et al. |

\* cited by examiner

Primary Examiner—Allen Cao
(74) Attorney, Agent, or Firm—Robert B. Martin; Bracewell & Patterson, L.L.P.

(57) ABSTRACT

A disk drive suspension has a longitudinal axis that defines inner and outer edges of the suspension. A flexure having a head gimbal assembly is aligned with the axis and spring-loaded to the suspension. A single limiter extends from the flexure through an opening in the suspension to hook to the suspension. The limiter limits the planar separation between the flexure and the suspension. The limiter is offset from the axis such that it is located much closer to the inner edge. During the unloading of the suspension from the disk, a tab on the suspension engages a ramp to begin to lift the suspension away from the disk. As the suspension is lifted, the flexure and head gimbal assembly have limited planar separation from the suspension due to the limiter. Since the limiter is offset from the axis, the surface of the head gimbal assembly is skewed relative to the disk. The offset limiter reduces the chance of the hub-side edge of the slider contacting the disk surface, since the limiter lifts the slider from hub side. For the same reason, the rim-side edge of the slider comes off the disk last, thus increasing the chance of contacting the disk at that point.

8 Claims, 2 Drawing Sheets

OFFSET LIMITER FOR REDUCING POTENTIAL OF DISK DAMAGE DURING UNLOAD SEQUENCE IN LOAD/UNLOAD DISK DRIVE

The present patent application is related to the following concurrently filed and co-pending patent applications: Ser. No. 09/764,764, entitled, Magnetic Disk Drive with Offset Load/Unload Tab; and Ser. No. 09/761,329, entitled, Air-Bearing Design To Induce Roll Bias During Load/Unload, which are incorporated herein by reference.

BACKGROUND OF THE INVENTION

1. Technical Field

The present invention relates in general to an improved disk drive, and in particular to an improved mechanism for a disk drive that loads and unloads the heads from the disks.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters that are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the head stack assembly. Within most HDDs, one magnetic read/write head or slider is associated with each side of each platter and flies just above the platter's surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

One type of head gimbal assembly has an integrated lead suspension (ILS). An ILS is typically formed by laminating several layers of material together and then selectively etching the layers to achieve a desired architecture. Alternatively, the layers may be formed by plating them on top of one another. These layers usually comprise at least one of each of the following: a stainless steel substrate or support layer, an insulation layer such as a polyimide, and a conductor layer such as copper. An ILS with a bent lead type design must be etched on both sides to clear the polyimide on the bent lead. This step requires additional process time and adds cost to the suspension.

For devices designed for load/unload operations, a flexure motion limiter is often required for damage prevention and dynamic performance. The flexure motion limiter requires forming the stainless steel on either the flexure or the load beam. The formed part is then interleaved with the unformed part at assembly to provide motion limitation on the flexure.

Some disk drives utilize load/unload technology to dislocate the actuator away from the disk at the end of an operation and when the drive is not in use. This is accomplished through (a) the use of a tab that extends from the suspension for directly lifting the suspension away from the disk, and (b) limiters extending from the flexure (and, thus, the slider) for lifting the slider when the suspension is lifted by the tab. Thus, the tab, flexure, and limiters work together to unload or lift the sliders from the disks. The tab functions to lift and guide the suspension up and down a ramp. As the tab is lifted, the suspension, through the flexure, lifts the slider off the disk. However, depending on the design of the slider and flexure, the force on the flexure may be greater than its yield strength, i.e., it can damage the flexure. To prevent this, the limiters stop the planar separation of the flexure from the suspension, and the slider is then lifted off the disk by the limiters.

In the prior art, limiters of this type are always symmetrically oriented relative to the slider. The limiters are either located directly on the longitudinal axis of the flexure and slider, or multiple limiters are symmetrically arrayed on the sides of the axis. In both cases, the limiters pull on the leading edge of the slider. During this process (see FIG. 1), the hub-side (inner diameter) edge 1 or the rim-side (outer diameter) edge 2 of the slider 3 can contact the disk surface 4 during the unloading process. If the hub-side edge 1 of the slider 3 contacts the disk 4, then it may result in data loss. Note that the data may be written on hub-side edge 1 of the centerline 7 of slider 3 (indicated by arrow 5), since the read/write element 6 is usually located along center line 7 of slider 3. There is no data on the portion 8 of disk 4 to the outer half of slider 3 in the unload zone 9 since read/write element 6 cannot be positioned over this area. Thus, an improved apparatus and method for reducing or eliminating damage to the inner portion of the unload during the unload sequence is needed.

SUMMARY OF THE INVENTION

One embodiment of a suspension in a disk drive has a longitudinal axis that defines inner and outer edges of the suspension. A flexure having a head gimbal assembly is aligned with the axis and spring-loaded to the suspension. A single limiter extends from the flexure through an opening in the suspension to hook to the suspension. The limiter limits the planar separation between the flexure and the suspension. The limiter is offset from the axis such that it is located much closer to the inner edge.

During the unloading of the suspension from the disk, a tab on the suspension engages a ramp to begin to lift the suspension away from the disk. As the suspension is lifted, the flexure and head gimbal assembly have limited planar separation from the suspension due to the limiter. Since the limiter is offset from the axis, the surface of the head gimbal assembly is skewed relative to the disk. The offset limiter reduces the chance of the hub-side edge of the slider contacting the disk surface, since the limiter lifts the slider from hub side. For the same reason, the rim-side edge of the slider comes off the disk last, thus increasing the chance of contacting the disk at that point.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
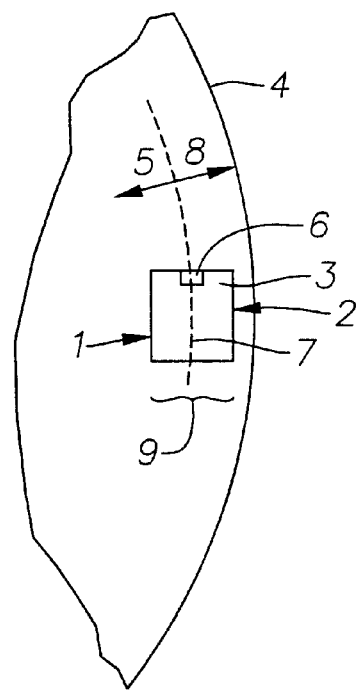
FIG. 1 is a plan view of a portion of a conventional disk drive illustrating the relationship between the head and the disk.
Figure 2:
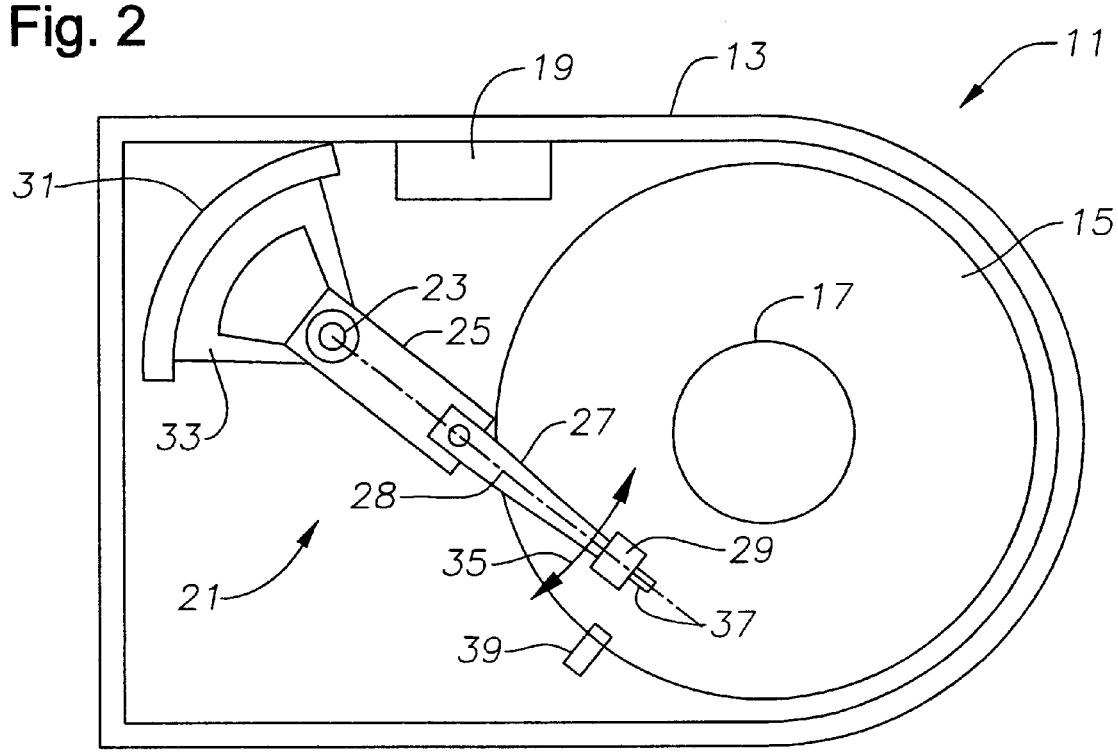
FIG. 2 is a top view of a disk drive constructed in accordance with the present invention.

Referring to FIG. 2, a schematic drawing of an information storage system comprising a magnetic hard disk file or drive 11 for a computer system is shown. Drive 11 has an outer housing or base 13 containing a plurality of stacked, parallel magnetic disks 15 (one shown) which are closely spaced apart. Disks 15 are rotated by a spindle motor located therebelow about a central drive hub 17. An actuator 21 comprises a plurality of stacked, parallel actuator arms 25 (one shown) in the form of a comb that is pivotally mounted to base 13 about a pivot assembly 23. A controller 19 is also mounted to base 13 for selectively moving the comb of arms 25 relative to disks 15.

In the embodiment shown, each arm 25 has extending from it a pair of parallel, cantilevered load beams or suspensions 27 with a longitudinal axis 28. A head gimbal assembly 29 having at least one magnetic read/write head secured to a flexure 30 (see FIG. 3) that is flexibly mounted to each suspension 27. The read/write heads magnetically read data from or magnetically write data to disks 15. Suspensions 27 and their flexures 30 have a spring-like quality which biases or maintains them in substantially parallel relationship relative to one another. A motor voice coil 26 housed within a conventional voice coil motor magnet assembly (not shown) is also mounted to the comb of arms 25 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and typically move in unison with one another. Each suspension 27 also has a load/unload tab 37 for engaging a ramp 39 located adjacent to the radial outer edge of disk 15 during loading and unloading sequences.

Figure 3:
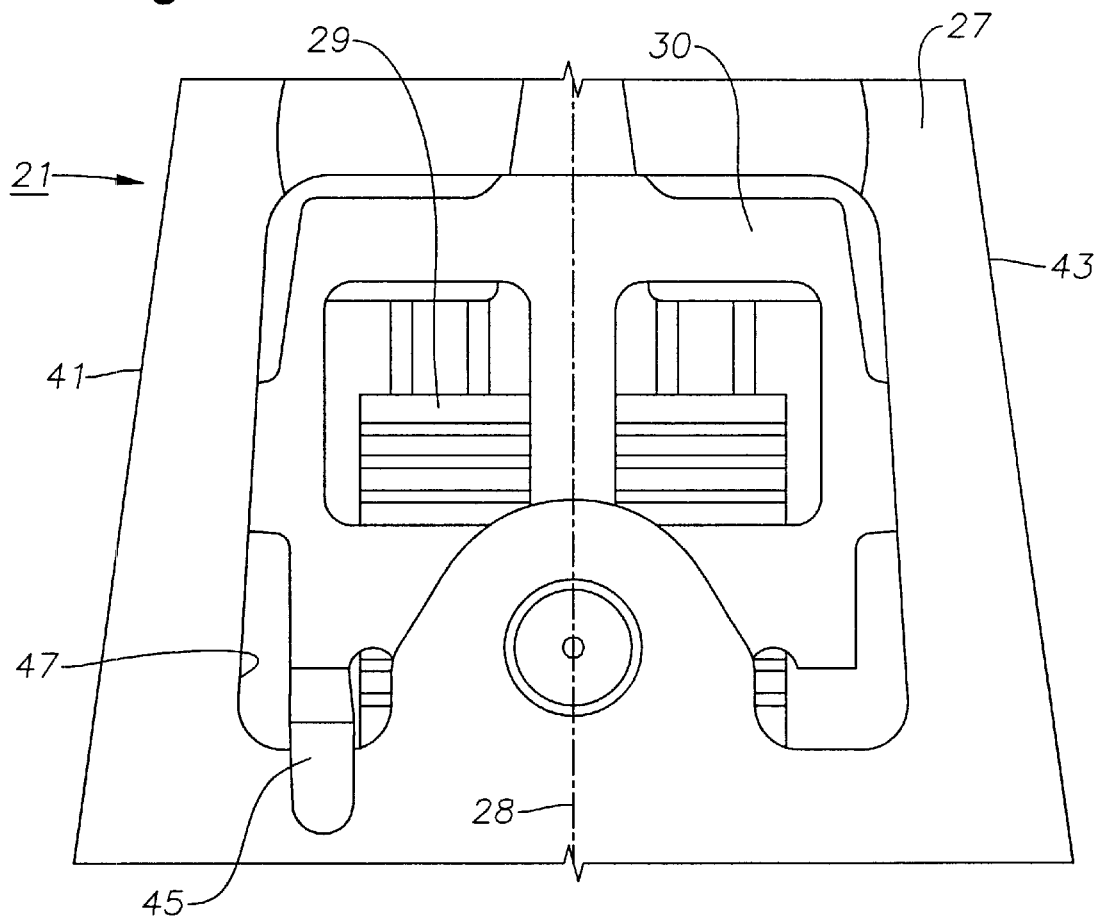
FIG. 3 is an enlarged top view of one-embodiment of a suspension in the disk drive of FIG. 2 constructed in accordance with the present invention.

Referring now to FIG. 3, a magnified view of a portion of the distal end of actuator 21 is shown. In this view, longitudinal axis 28 of arm 25 and suspension 27 extends vertically to define a "hub" or inner edge 41 and "rim" or outer edge 43. Suspension 27, flexure 30, and head gimbal assembly 29 are all substantially aligned along axis 28. A single limiter 45 extends from flexure 30 through an opening 47 in suspension 27 to releasably engage suspension 27. Limiter 45 is essentially a formed finger or hook that limits the planar separation (e.g., into the page) between flexure 30 (and, thus, head gimbal assembly 29) and suspension 27. Limiter 45 is offset from axis 28 such that it is located much closer to inner edge 41 than outer edge 43.

Figure 4:
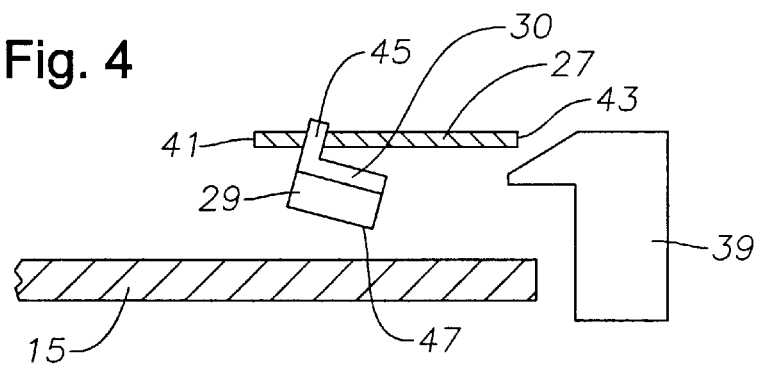
FIG. 4 is a schematic end view of the suspension, disk, and ramp of FIG. 2 exaggerating an unload sequence.

In operation (FIG. 4) during the unload sequence, the tab 37 (FIG. 2) on suspension 29 engages the ramp 39 to begin to lift suspension 27 away from disk 15. As suspension 27 is lifted, flexure 30 and head gimbal assembly 29 have limited planar separation from suspension 27, due to limiter 45. Since limiter 45 is offset from axis 28 (FIG. 3) adjacent to inner edge 41, the surface of head gimbal assembly 29 is skewed (shown greatly exaggerated) relative to the surface of disk 15. Limiter 45 biases the probability of disk contact to the outer radial edge 47 of head gimbal assembly 29. Edge 47 is unable to damage the inner portion of the unload zone on disk 15.

The present invention has several advantages. The use of a single limiter that is offset from the longitudinal axis of the suspension forces the head gimbal assembly to be skewed relative to the disk as the suspension is unloaded from the disk. Since the limiter is located near the inner edge of the suspension, the head gimbal assembly is biased to contact the outer edge of the disk. Thus, as the suspension is unloaded at the outer edge or rim of the disk, the unused perimeter or unload zone of the disk is significantly more exposed to contact and/or damage such that no data is lost.

While the invention has been shown or described in only some of its forms, it should be apparent to those skilled in the art that it is not so limited, but is susceptible to various changes without departing from the scope of the invention.

What is claimed is:

1. An arm for a disk drive having a base and a disk rotatably mounted to the base, the arm comprising:
    a suspension with a longitudinal axis;
    a flexure flexibly mounted to the suspension;
    a head mounted to the flexure and adapted to read data from and write data to the disk;
    a limiter offset from the longitudinal axis and extending from the flexure into releasable contact with the suspension; and wherein
        the limiter engages the suspension to skew the flexure such that the head is adapted to be biased relative to the disk.

2. The arm of claim 1 wherein the limiter comprises a hook that is located adjacent to an inner edge of the suspension, wherein the hook extends through an opening in the suspension.

3. The arm of claim 1 wherein the limiter biases the head such that an outer edge of the head is adapted to contact a perimeter of the disk.

4. A disk drive, comprising:
    a base;
    a disk rotatably mounted to the base;
    an actuator having a suspension with a longitudinal axis, a flexure flexibly mounted to the suspension, and a head mounted to the flexure for reading data from and writing data to the disk, the actuator being pivotally mounted to the base adjacent to the disk for relative movement thereto;
    a limiter offset from the longitudinal axis and extending from the flexure into releasable contact with the suspension; and wherein during an unload sequence when the suspension is unloaded from the disk, the limiter engages the suspension to skew the flexure such that the head is biased relative to the disk.

5. The disk drive of claim 4 wherein the limiter comprises a hook that is located adjacent to an inner edge of the suspension, wherein the hook extends through an opening in the suspension.

6. The disk drive of claim 4 wherein the limiter biases the head such that an outer edge of the head contacts a perimeter of the disk.

7. A disk drive, comprising:

a base having a ramp;

a disk rotatably mounted to the base such that a perimeter of the disk is located adjacent to the ramp;

an actuator having a suspension with a longitudinal axis and a load/unload tab, a flexure aligned with the axis and flexibly mounted to the suspension, and a head aligned with the axis and mounted to the flexure for reading data from and writing data to the disk, the actuator being pivotally mounted to the base adjacent to the disk for relative movement thereto;

a single limiter offset from the longitudinal axis and extending from the flexure into releasable contact with the suspension; and wherein during an unload sequence when the tab of the suspension engages the ramp such that the suspension is unloaded from the disk, the limiter engages the suspension to skew the flexure such that the head is biased relative to the disk and an outer edge of the head contacts the perimeter of the disk.

8. The disk drive of claim 7 wherein the limiter comprises a hook that is located adjacent to an inner edge of the suspension, wherein the hook extends through an opening in the suspension.

* * * * *